US008500295B2

(12) United States Patent
Chang

(10) Patent No.: US 8,500,295 B2
(45) Date of Patent: Aug. 6, 2013

(54) ENERGY-SAVING ILLUMINATION SYSTEM HAVING PIEZOELECTRIC MATERIALS

(75) Inventor: Kuo-Cheng Chang, Miao-Li Hsien (TW)

(73) Assignee: Foxsemicon Intergrated Technology, Inc., Chu-Nan, Miao-Li Hsien (TW)

( * ) Notice: Subject to any disclaimer, the term of this patent is extended or adjusted under 35 U.S.C. 154(b) by 412 days.

(21) Appl. No.: 12/965,906

(22) Filed: Dec. 12, 2010

(65) Prior Publication Data

US 2012/0069555 A1 Mar. 22, 2012

(51) Int. Cl.
*B60Q 1/00* (2006.01)
*F21S 8/00* (2006.01)

(52) U.S. Cl.
USPC ........ 362/192; 362/145; 362/153; 362/153.1; 362/193

(58) Field of Classification Search
USPC ............... 362/145, 147, 153–153.1, 192–193
See application file for complete search history.

(56) References Cited

U.S. PATENT DOCUMENTS

| 6,236,118 | B1 * | 5/2001 | Vasija et al. | 290/1 E |
| 2004/0068935 | A1 * | 4/2004 | Ichikawa et al. | 49/25 |
| 2005/0258717 | A1 * | 11/2005 | Mullen | 310/339 |

* cited by examiner

*Primary Examiner* — Sean Gramling
(74) *Attorney, Agent, or Firm* — Altis Law Group, Inc.

(57) ABSTRACT

An energy-saving illumination system includes a piezoelectric floor, a revolving door, an accumulator, a light source, and an electrical power sensing device. The piezoelectric floor contains piezoelectric material therein. The revolving door comprises a power generating device. The accumulator is electrically connected to the piezoelectric floor and the power generating device. The light source is electrically connected with the accumulator. The electrical power sensing device is configured to detect the quantity of electric charge in the accumulator; the power generating device of the revolving door charges the accumulator according to the detected result obtained from the electrical power sensing device in respect to the accumulator.

9 Claims, 2 Drawing Sheets

ENERGY-SAVING ILLUMINATION SYSTEM HAVING PIEZOELECTRIC MATERIALS

BACKGROUND

1. Technical Field

The disclosure generally relates to energy-saving illumination systems, and particularly, to an illumination system containing piezoelectric material which is used to generate electric energy for providing power to a light source of the illumination system.

2. Description of Related Art

A piezoelectric material is a solid material (notably crystals and certain ceramics) which accumulates electrical charge therein in response to applied mechanical strain thereto. The piezoelectric effect is understood as the linear electromechanical interaction between the mechanical and the electrical state in crystalline materials with no inversion symmetry. The piezoelectric effect is a reversible process in that materials exhibiting the direct piezoelectric effect (the internal generation of electrical charge resulting from an applied mechanical force) also exhibit the reverse piezoelectric effect (the internal generation of a mechanical force resulting from an applied electrical field). For example, lead zirconate titanate crystals will generate measurable piezoelectricity when their static structure is deformed by about 0.1% of the original dimension. Conversely, lead zirconate titanate crystals will change about 0.1% of their static dimension when an external electric field is applied to the material. For the one of ordinary skill in the illumination field, how to use the direct piezoelectric effect is the one researching direction.

Therefore, there is a desire to provide an energy-saving illumination system using the direct piezoelectric effect.

BRIEF DESCRIPTION OF THE DRAWINGS

Many aspects of the disclosures can be better understood with reference to the following drawings. The components in the drawings are not necessarily drawn to scale, the emphasis instead being placed upon clearly illustrating the principles of the disclosures. Moreover, in the drawings, like reference numerals designate corresponding parts throughout the different views.

DETAILED DESCRIPTION

Figure 1:
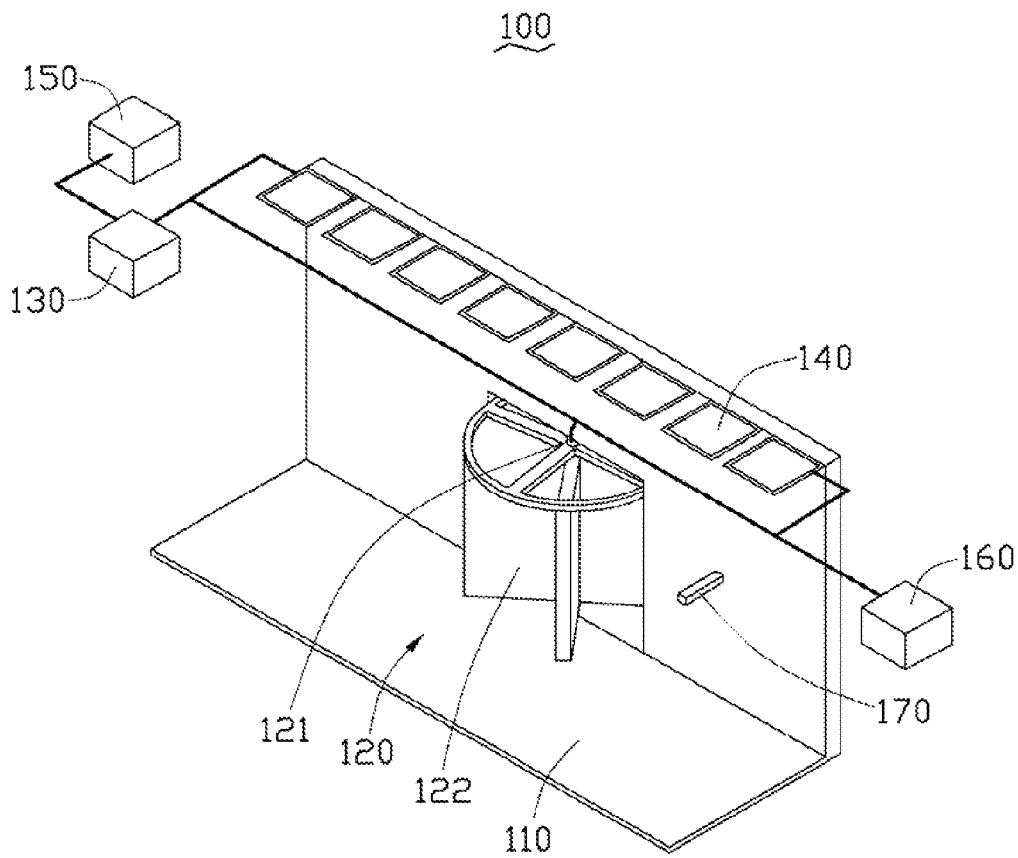
FIG. 1 is schematic view of an exemplary embodiment of an energy-saving illumination system in accordance with the disclosure.

Referring to in FIG. 1, an energy-saving illumination system 100 in accordance with an exemplary embodiment of the present disclosure, includes a piezoelectric floor 110, a revolving door 120, an accumulator 130, a light source 140 and an electrical power sensing device 150. The revolving door 120 is provided at an entrance of a building or a place, such as a department store, a railway station, a zoo and so on. The piezoelectric floor 110 is provided in front of the revolving door 120 such that when people want to enter the building or place, they must first walk over the piezoelectric floor 110.

The piezoelectric floor 110 has many piezoelectric cells arranged therein, and the piezoelectric cells are made of piezoelectric material. The piezoelectric cells can generate electrical charge (power) resulting from an applied mechanical force thereto, such as the walk of people over the piezoelectric floor 110.

Figure 2:
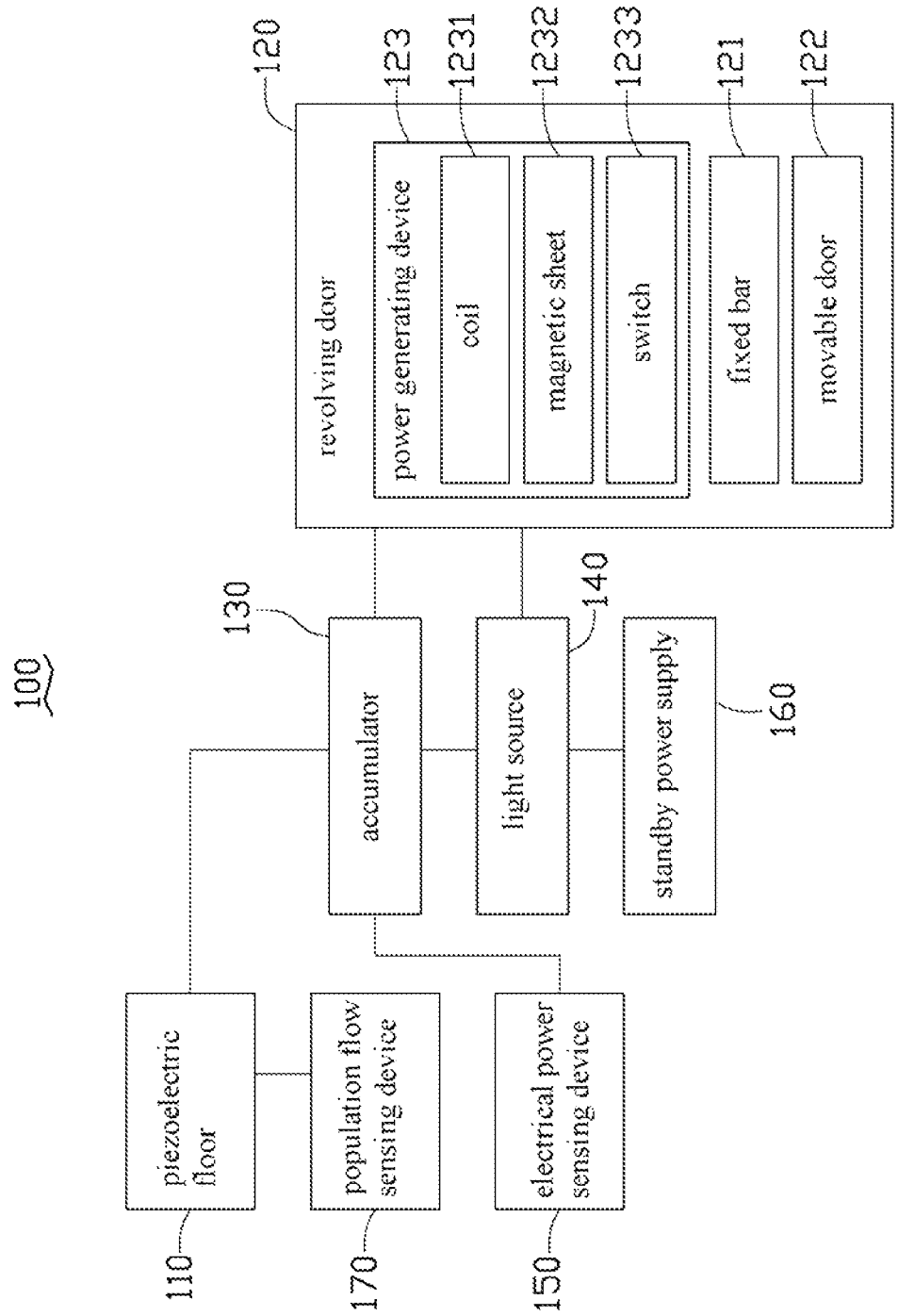
FIG. 2 is a block diagram of the energy-saving illumination system in FIG. 1.

The revolving door 120 generally includes a fixed bar 121 located in the center thereof, several movable doors 122 fixed to the fixed bar 121 and extending radially outwardly from the fixed bar 121, and a power generating device 123 placed between the fixed bar 121 and the movable doors 122. The power generating device 123 has a coil 1231, a magnetic sheet 1232, and a switch 1233 (as shown in FIG. 2). In the present embodiment, the coil 1231 is fixed on the fixed bar 121, and the magnetic sheet 1232 is located on the movable doors 122. When the movable doors 122 move around the fixed bar 121 resulting from an applied mechanical force (such as a thrusting force exerted by a user) on the movable doors 122, the magnetic sheet 1232 can be moved by the movable doors 122 around the coil 1231, so that an electrical current is generated on the coil 1231. Alternatively, the magnetic sheet 1232 can be fixed on the fixed bar 121, and the coil 1231 is located on the movable doors 122 to move around the fixed bar 121. Generally, the switch 1233 is placed on the fixed bar 121 of the power generating device 123, to control the coil 1231 or the magnetic sheet 1232 on the movable doors 122 to move with the movable doors 122 or not.

The accumulator 130 is electrically connected to the piezoelectric floor 110 and the power generating device 123. All the power generated from the piezoelectric cells contained in the piezoelectric floor 110 and the power generating device 123 of the revolving door 120 transmits to the accumulator 130. It can be understood that the accumulator 130 can also supply power to the movable doors 122 to cause them to rotate around the central fixed bar 121.

The light source 140 can be a light emitting diode (LED) lamp, a low voltage sodium lamp, or other energy-saving light sources. The light source 140 is electrically connected with the accumulator 130, such that the accumulator 130 can supply power to the light source 140.

The electrical power sensing device 150 is provided to detect the amount of electric charge (power) in the accumulator 130. The accumulator 130 has two charging modes, which are described in details herebelow.

When the amount of electric charge in the accumulator 130 is at a high level, such as the amount of electric charge therein is greater than or equal to 80% of the total quantity of electric charge which can be stored up in the accumulator 130, the accumulator 130 is charged by the piezoelectric floor 110 and supplies power to the revolving door 120 and the light source 140. In the revolving door 120, the coil 1231 or the magnetic sheet 1232 is shifted by the switch 1233 to be not movable with the movable doors 122. At this moment, the power generating device 123 is in the idle state and the revolving door 120 is driven to rotate by the power from the accumulator 130.

When the amount of electric charge in the accumulator 130 is at a low level, such as the amount of electric charge in the accumulator 130 is less than 80% of the total quantity of electric charge which can be stored up in the accumulator 130, the accumulator 130 is charged by the piezoelectric floor 110 and the power generating device 123 of the revolving door 120, simultaneously; the accumulator 130 supplies power to the light source 140. In the revolving door 120, the coil 1231 or the magnetic sheet 1232 is shifted by the switch 1233 to a position that it moves with the movable doors 122; at this moment, the power generating device 123 is in a condition that it generates power which charges the accumulator 130.

It can be understood that the value for deciding the high or low level of electric charge in the accumulator 130 can be predetermined according to a simulated calculation in advance. For example, the high level can be considered that the quantity of electric charge in the accumulator 130 is greater than or equal to 50% or 60% of the total quantity of electric charge which can be stored up in the accumulator 130. In addition, the coil 1231 or the magnetic sheet 1232 can always run with the movable doors 122, so that when the revolving door 120 rotates the coil 1231 always generates the electrical current therein due to a changing magnetic field; the current is supplied to the accumulator 130.

Thus it can be seen that the mechanical energy can be converted to the electrical energy by the piezoelectric floor 110 and store the generated electric charge in the accumulator 130 to supply the light source 140, to save energy effectively. Furthermore, the electric charge in the accumulator 130 can be detected by the electrical power sensing device 150 and when the level is low, the power generating device 123 of the revolving door 120 can charge the accumulator 130 according to the detected result from the electrical power sensing device 150, thereby to use the power generating device 123 efficiently.

The energy-saving illumination system 100 further includes a standby power supply 160 which is electrically connected to the light source 140 and the revolving door 120. When the quantity of electric charge in the accumulator 130 is not enough to support the light source 140 to work, or one of the piezoelectric floor 110 and accumulator 130 can not generate power, the standby power supply 160 supplies the electric power to the light source 140 and the revolving door 120.

The energy-saving illumination system 100 further includes a population flow sensing device 170 which is configured for detecting the flow rate of human being walking through the piezoelectric floor 110. In the exemplary embodiment, the population flow sensing device 170 can be an infrared radial sensor, a monitor or other detecting device.

When the flow rate of human being walking through the piezoelectric floor 110 is greater than or equal to a predetermined number which can be determined by a simulated calculation in advance, the accumulator 130 is charged by the piezoelectric floor 110; simultaneously, the accumulator 130 supplies power to the revolving door 120 and the light source 140. This is similar to the state when the power of electric charge in the accumulator 130 is at a high level.

When the flow rate of human being walking through the piezoelectric floor 110 is less than the predetermined number, the accumulator 130 is charged by the piezoelectric floor 110 and the power generating device 123 of the revolving door 120, simultaneously; the accumulator 130 supplies power to the light source 140. This is similar to the state when the quantity of electric charge in the accumulator 130 is at a low level.

The flow rate of human being walking through the piezoelectric floor 110 can be detected by the population flow sensing device 170, and the power generating device 123 of the revolving door 120 can charge the accumulator 130 according to the detected result from the population flow sensing device 170, thereby to efficiently use the power generated by power generating device 123 of the revolving door 120.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. An energy-saving illumination system, comprising:
    a piezoelectric floor containing piezoelectric material therein;
    a revolving door comprising a power generating device, said piezoelectric floor being located in front of the revolving door;
    an accumulator electrically connected to the piezoelectric floor and the power generating device;
    a light source electrically connected with the accumulator; and
    an electrical power sensing device configured to detect the amount of electric charge in the accumulator, the power generating device of the revolving door charging the accumulator according to the detected result obtained from the electrical power sensing device with respect to the accumulator;
    wherein the revolving door further comprises a fixed bar located in the center thereof, at least one movable door secured radially to the fixed bar, and the power generating device placed between the fixed bar and the at least one movable door.

2. The energy-saving illumination system of claim 1, wherein the power generating device comprises a coil, a magnetic sheet, and a switch, the coil is fixed on the fixed bar, and the magnetic sheet is located on the at least one movable door.

3. The energy-saving illumination system of claim 1, the power generating device comprises a coil, a magnetic sheet, and a switch, the magnetic sheet is fixed on the fixed bar, and the coil is located on the at least one movable door to move around the fixed bar.

4. The energy-saving illumination system of claim 1, wherein the accumulator is charged by the piezoelectric floor and supplies power to the revolving door and the light source when the amount of electric charge in the accumulator is at a high level, and wherein the accumulator is charged by the piezoelectric floor and the power generating device of the revolving door, simultaneously, and the accumulator supplies power to the light source when the quantity of electric charge in the accumulator is at a low level.

5. The energy-saving illumination system of claim 1, further comprising a standby power supply electrically connected to the light source and the revolving door, wherein the standby power supply is configured for supplying the electric power to the light source and the revolving door when the accumulator does not supply power to the light source and the revolving door.

6. The energy-saving illumination system of claim 1, further comprising a population flow sensing device configured for detecting the flow rate of human beings walking through the piezoelectric floor, the power generating device of the revolving door charges the accumulator according to the detected result obtained from the population flow sensing device.

7. The energy-saving illumination system of claim 6, wherein the accumulator is charged by the piezoelectric floor and the accumulator supplies power to the revolving door and the light source when the flow rate of human beings walking through the piezoelectric floor is greater than or equal to a predetermined value, and wherein the accumulator is charged by the piezoelectric floor and the power generating device of the revolving door and the accumulator supplies power to the light source when the flow rate of human beings through the piezoelectric floor is less than the predetermined value.

8. An energy-saving illumination system, comprising:
    a piezoelectric floor containing piezoelectric material therein;

a revolving door comprising a power generating device, said piezoelectric floor being located in front of the revolving door;

an accumulator electrically connected to the piezoelectric floor and the power generating device;

a light source electrically connected with the accumulator; and an electrical power sensing device configured to detect the amount of electric charge in the accumulator, the power generating device of the revolving door charging the accumulator according to the detected result obtained from the electrical power sensing device with respect to the accumulator;

wherein the accumulator is charged by the piezoelectric floor and supplies power to the revolving door and the light source when the amount of electric charge in the accumulator is at a high level, and wherein the accumulator is charged by the piezoelectric floor and the power generating device of the revolving door, simultaneously, and the accumulator supplies power to the light source when the quantity of electric charge in the accumulator is at a low level.

9. An energy-saving illumination system, comprising:

a piezoelectric floor containing piezoelectric material therein;

a revolving door comprising a power generating device, said piezoelectric floor being located in front of the revolving door;

an accumulator electrically connected to the piezoelectric floor and the power generating device;

a light source electrically connected with the accumulator;

an electrical power sensing device configured to detect the amount of electric charge in the accumulator, the power generating device of the revolving door charging the accumulator according to the detected result obtained from the electrical power sensing device with respect to the accumulator; and a standby power supply electrically connected to the light source and the revolving door, wherein the standby power supply is configured for supplying the electric power to the light source and the revolving door when the accumulator does not supply power to the light source and the revolving door.

* * * * *